(12) United States Patent
Dierksmeier et al.

(10) Patent No.: US 10,808,720 B2
(45) Date of Patent: Oct. 20, 2020

(54) AXIAL FLOW COMPRESSOR ASSEMBLY

(71) Applicants: Rolls-Royce Corporation, Indianapolis, IN (US); Rolls-Royce North American Technologies Inc., Indianapolis, IN (US)

(72) Inventors: Douglas D. Dierksmeier, Franklin, IN (US); Edward C. Rice, Indianapolis, IN (US); Ryan C. Humes, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 1384 days.

(21) Appl. No.: 15/188,721

(22) Filed: Jun. 21, 2016

(65) Prior Publication Data
US 2017/0363090 A1    Dec. 21, 2017

(51) Int. Cl.
*F01D 5/06*   (2006.01)
*F04D 29/52*  (2006.01)
*F04D 29/64*  (2006.01)
*F01D 25/24*  (2006.01)

(52) U.S. Cl.
CPC ......... *F04D 29/522* (2013.01); *F01D 25/246* (2013.01); *F04D 29/644* (2013.01); *F05D 2250/231* (2013.01); *Y02T 50/672* (2013.01)

(58) Field of Classification Search
None
See application file for complete search history.

(56) References Cited

U.S. PATENT DOCUMENTS

| | | | | |
|---|---|---|---|---|
| 3,338,508 A | * | 8/1967 | Castle | F01D 9/044 415/209.1 |
| 4,277,225 A | * | 7/1981 | Dubois | F01D 5/06 416/193 A |
| 6,148,518 A | * | 11/2000 | Weiner | F01D 11/08 29/889 |
| 8,087,885 B2 | * | 1/2012 | Suciu | F01D 5/025 415/199.4 |
| 2014/0157757 A1 | | 6/2014 | Hasel et al. | |

FOREIGN PATENT DOCUMENTS

WO    2003/089792 A1    10/2003

* cited by examiner

*Primary Examiner* — Nathaniel E Wiehe
(74) *Attorney, Agent, or Firm* — Barnes & Thornburg LLP

(57) ABSTRACT

An axial flow compressor comprises a tubular casing which encases a rotatable shaft, a pair of rotor segments coupled to the rotatable shaft and each comprising a bladed disc, and a banded stator segment disposed between the pair of rotor segments and comprising a plurality of stator vanes extending between an outer flowpath ring and an inner flowpath ring. A method of assembling an axial flow compressor comprises installing a rotor segment inside a tubular compressor casing, installing a vane segment adjacent the installed rotor segment, and repeating the steps of installing a rotor segment and vane segment until a desired number of rotor segment and vane segment pairs are installed.

14 Claims, 5 Drawing Sheets

AXIAL FLOW COMPRESSOR ASSEMBLY

FIELD OF THE DISCLOSURE

The present disclosure relates generally to fluid compression, and more specifically to an axial flow compressor assembly.

BACKGROUND

Axial-flow compressors are used in a variety of applications to compress a fluid from an inlet pressure to a discharge pressure which is higher than inlet pressure. Axial-flow compressors typically comprise a rotatable assembly of a plurality of blades mounted to a rotor and a static assembly of a plurality of vanes mounted to a casing. The cross-sectional area of the fluid passage in an axial-flow compressor typically decreases as the fluid travels from inlet to discharge. In operation, the rotating blades accelerate the fluid into a diminishing cross-sectional area, thus compressing or pressurizing the fluid.

Applications of axial-flow compressors include, but are not limited to, gas turbine engines including those used in air-, land-, and sea-based applications for providing electrical generation and/or propulsion, expendable machines such as for missile propulsion systems, and other rotating machinery generally. In many applications there is a need in the art for axial flow compressors which can be achieved at a lower cost of manufacture and operation. Efforts to reduce the cost of manufacture have included, for example, the substitution of metal engine components with those made of lightweight composite materials which tend to be less expensive to procure and machine to achieve the desired compressor components. However, material substitution alone is insufficient to achieve the desired cost savings when manufacturing and operating an axial flow compressor, particularly for expendable applications where the manufacturing cost is lost after a single use.

It is thus desired for an improvement in the art of manufacturing and operating axial flow compressors to provide less expensive alternatives to existing designs.

SUMMARY

The present application discloses one or more of the features recited in the appended claims and/or the following features which, alone or in any combination, may comprise patentable subject matter.

According to an aspect of the present disclosure, a method of assembling an axial flow compressor comprises providing a tubular compressor casing having a first end and a second end; installing a rotor segment inside said compressor casing from a first end of said casing and positioning said rotor segment proximate the second end of said casing; installing a vane segment inside said compressor casing from the first end of said casing and positioning said vane segment adjacent the installed rotor segment; installing another rotor segment inside said compressor casing from the first end and positioning the rotor segment adjacent the installed vane segment; installing another vane segment inside said compressor casing from the first end of said casing and positioning said vane segment adjacent the installed rotor segment; repeating the steps of installing another rotor segment and installing another vane segment until a desired number of rotor segment and vane segment pairs are installed; and installing a final rotor segment inside said compressor casing from the first end and positioning said final rotor segment next to the last installed vane segment.

In some embodiments the compressor casing is cylindrical. In some embodiments the compressor casing is configured to contain axial flow from said first end to said second end. In some embodiments the compressor casing is configured to contain flow from said second end to said first end. In some embodiments the compressor casing is conical having a smallest radius at said second end.

According to another aspect of the present disclosure, an axial flow compressor assembly comprises a tubular compressor casing configured to encase a portion of a rotatable shaft; a pair of rotor segments each comprising a bladed disc disposed within said casing, said rotor segments being configured to be coupled to the shaft; and a banded stator segment disposed within said casing axially between said pair of rotor segments, said stator segment comprising an outer flowpath ring, an inner flowpath ring, and a plurality of vanes extending between said rings and being spaced around the circumference thereof, said stator segment further comprising an abradable ring extending axially from said outer flowpath ring and radially between the blade tips of one of said rotor segments and said casing.

In some embodiments the stator segment further comprises one or more tangs extending radially outward from said outer flowpath ring to thereby space said outer flowpath ring radially inward from said casing. In some embodiments the compressor assembly further comprises a sealing arm extending between the pair of rotor segments, the sealing arm adapted to engage a sealing member of the banded stator segment. In some embodiments the seal formed by the engagement of the sealing arm and the sealing member is a labyrinth seal. In some embodiments a fluid flowpath is defined in a radially outward dimension by the outer flowpath ring and in a radially inward dimension by the inner flowpath ring and the rotor segment. In some embodiments the compressor assembly further comprises an annular diffuser disposed at an end of the casing. In some embodiments the outer flowpath ring further comprises a keyway to prevent rotation of the stator segment. In some embodiments the casing tapers from a first end to a second end.

According to yet another aspect of the present disclosure, an axial flow compressor assembly comprises a tubular compressor casing configured to encase a portion of a rotatable shaft; a pair of rotor segments each comprising a bladed disc disposed within said casing, said rotor segments being configured to be coupled to the shaft; and a banded stator segment disposed within said casing axially between said pair of rotor segments, said stator segment comprising an outer flowpath ring, an inner flowpath ring, and a plurality of vanes extending between said rings and being spaced around the circumference thereof, said stator segment further comprising one or more tangs extending radially outward from said outer flowpath ring to thereby space said outer flowpath ring radially inward from said casing.

In some embodiments the stator segment further comprises an abradable ring extending axially from said outer flowpath ring and radially between the blade tips of one of said rotor segments and said casing. In some embodiments the compressor assembly further comprises a sealing arm extending between the pair of rotor segments, the sealing arm adapted to engage a sealing member of the banded stator segment. In some embodiments the seal formed by the engagement of the sealing arm and the sealing member is a labyrinth seal. In some embodiments a fluid flowpath is defined in a radially outward dimension by the outer flowpath ring and in a radially inward dimension by the inner flowpath ring and the rotor segment. In some embodiments the compressor assembly further comprises an annular diffuser disposed at an end of the casing. In some embodiments the compressor assembly further comprises at least one pin inserted through a pair of adjacent tangs to prevent rotation of adjacent stator segments.

BRIEF DESCRIPTION OF THE DRAWINGS

The following will be apparent from elements of the figures, which are provided for illustrative purposes and are not necessarily to scale.

Figure 1A:
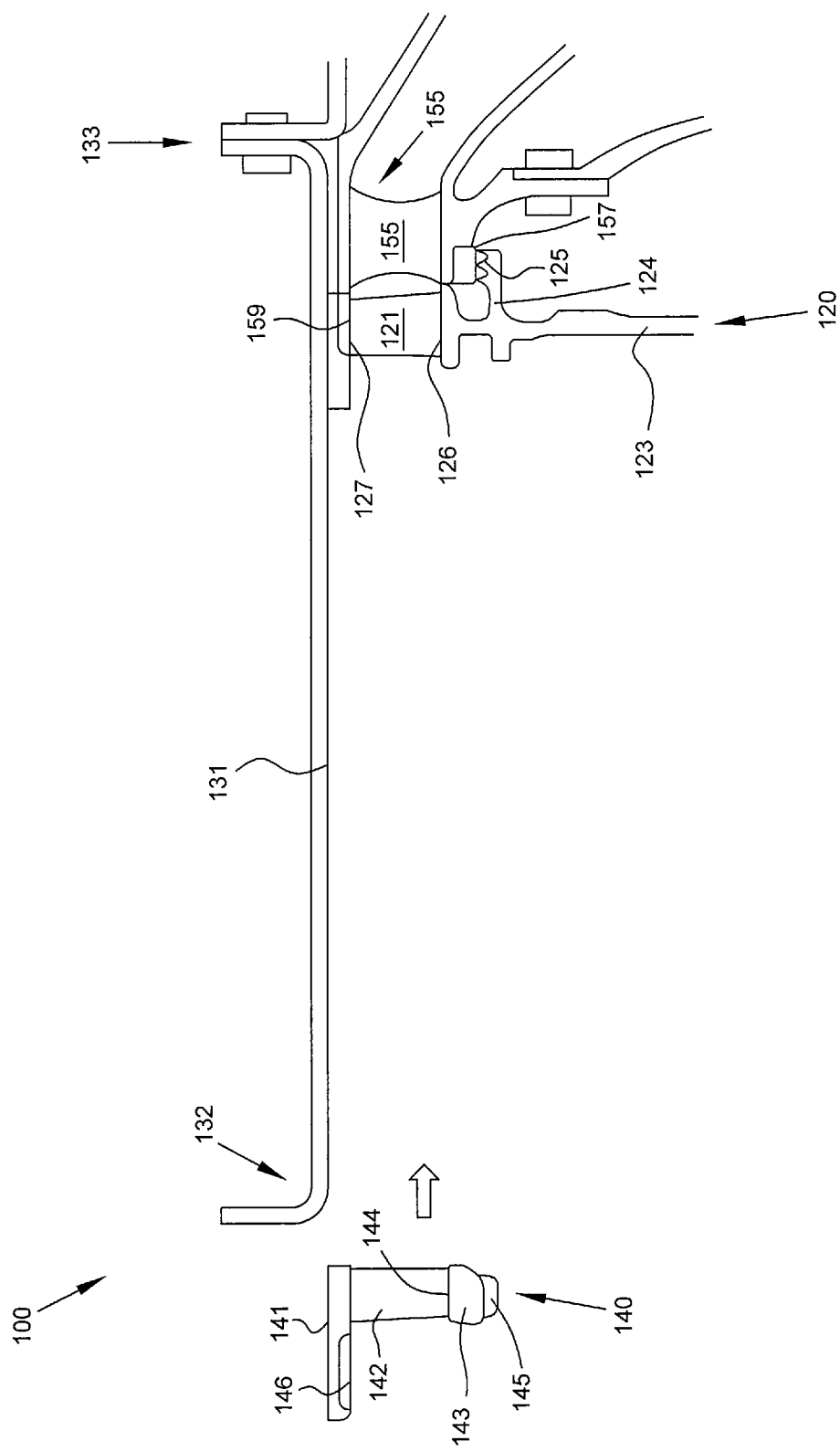
FIG. 1A is a side cutaway view of a partially-assembled axial flow compressor in accordance with some embodiments of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents systems and methods of manufacturing and assembling an axial-flow compressor to achieve a less expensive compressor than is currently available in the art. More specifically, the present disclosure is directed to an axial-flow compressor which comprises a tubular casing which encases a rotatable shaft, a pair of rotor segments coupled to the rotatable shaft and each comprising a bladed disc, and a banded stator segment disposed between the pair of rotor segments and comprising a plurality of stator vanes extending between an outer flowpath ring and an inner flowpath ring. A method of assembling an axial flow compressor is further presented, the method comprising installing a rotor segment inside a tubular compressor casing, installing a vane segment adjacent the installed rotor segment, and repeating the steps of installing a rotor segment and vane segment until a desired number of rotor segment and vane segment pairs are installed.

Figure 1B:
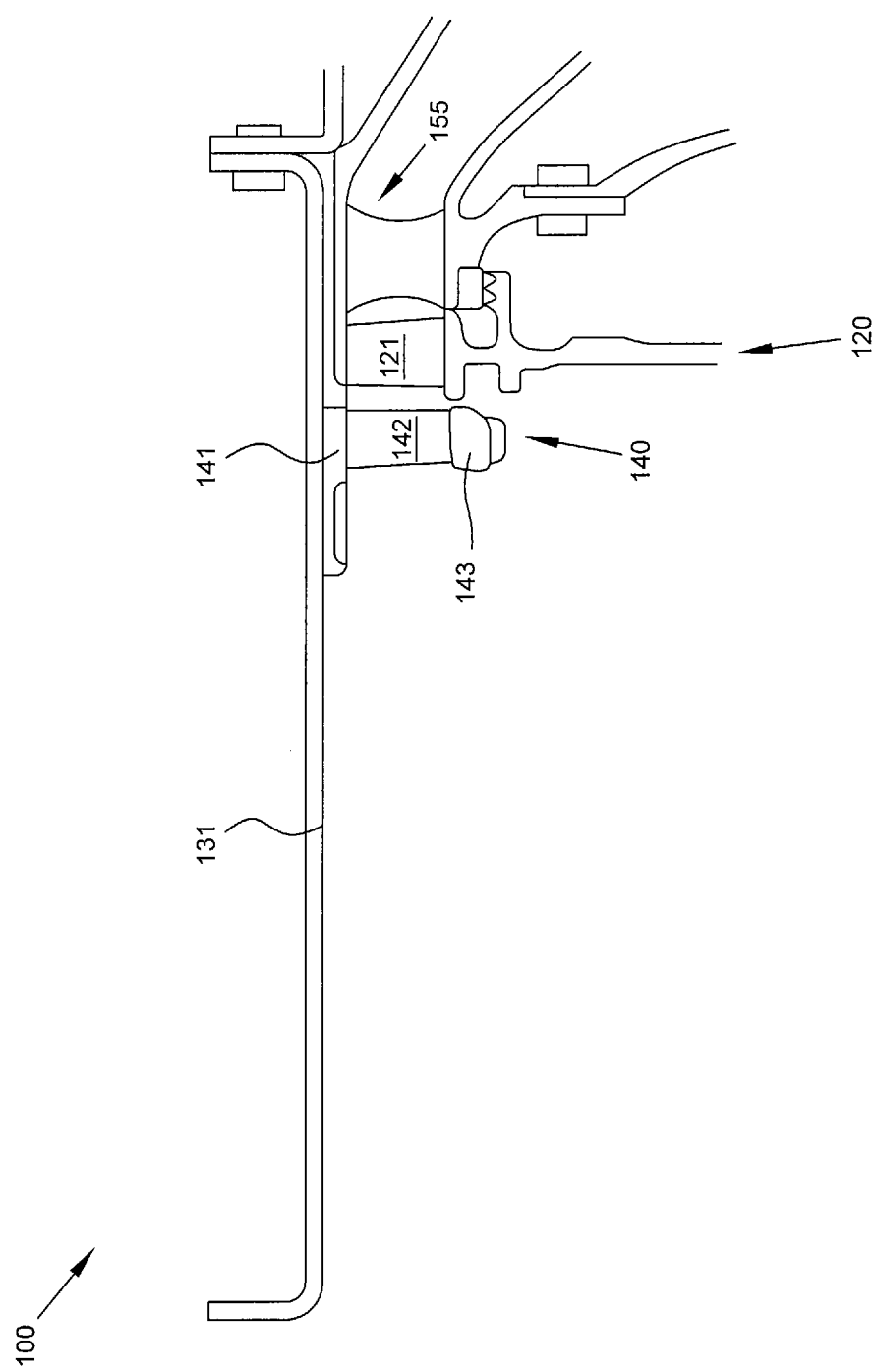
FIG. 1B is a side cutaway view of a partially-assembled axial flow compressor in accordance with some embodiments of the present disclosure.
Figure 1C:
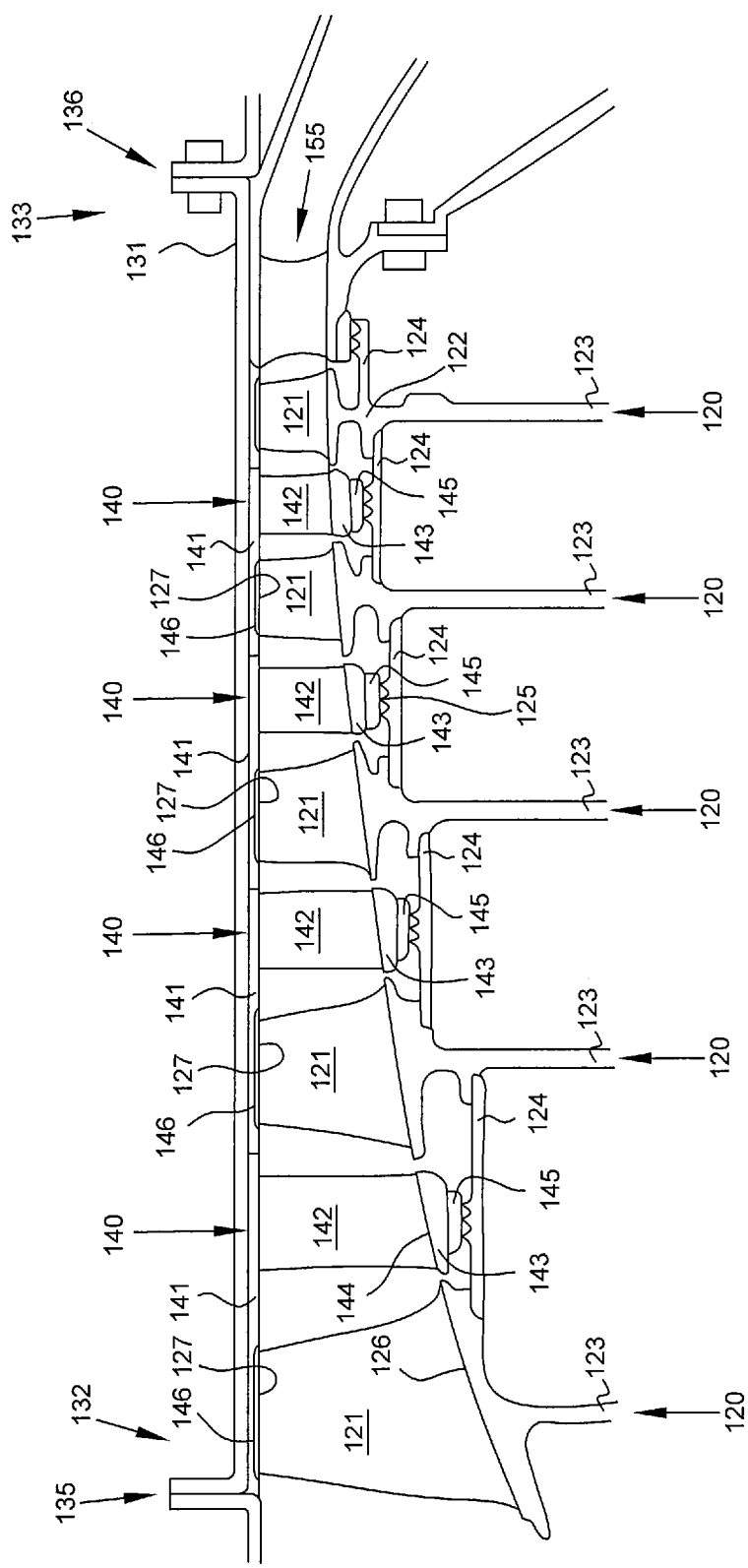
FIG. 1C is a side cutaway view of an axial flow compressor in accordance with some embodiments of the present disclosure.

FIGS. 1A through 1C present illustrations of the assembly process for the disclosed an axial flow compressor 100. FIGS. 1A and 1B show views of a partially assembled axial flow compressor 100, while a fully assembled axial flow compressor 100 is shown in FIG. 1C.

An axial flow compressor 100 comprises a rotatable assembly 110 and a static assembly 130. The rotatable assembly 110 may be coupled to a shaft and adapted to rotate about an axis of rotation. The rotatable assembly 110 comprises a plurality of rotor segments 120. The static assembly 130 comprises a casing 131 which encases the rotatable assembly 110 and a plurality of stator segments 140 disposed in the casing 131.

A fluid flow path is defined through the axial flow compressor 100 between the casing 131 and a radially inner flow boundary 134 formed by the rotor segments 120 and stator segments 140. As fluid passes from an axially forward end of the compressor 100 to an axially aft end, it passes between blades 121 of the rotor segments 120 and stator vanes 141 of the stator segments 140.

Casing 131 may be a tubular casing or a cylindrical casing, and in some embodiments may be tapered from one axial end to the other axial end. Casing 131 may comprise a first end 132 and second end 133, with the first end 132 being axially forward of the second end 133. In some embodiments casing 131 is conical. A conical casing 131 may have a smaller radius at second end 133 than at first end 132. In some embodiments casing 131 may be formed by a rolled ring forging or a rolled and welded plate stock. In some embodiments casing 131 may be formed by casting or by a composite and resin method such as a wound composite fiber coated with resin and cured.

Casing 131 may be configured to contain axial fluid flow from first end 132 to second end 133. In other embodiments casing 131 may be configured to contain axial fluid flow from second end 133 to first end 132. Casing 131 may be adapted to encase a plurality of rotor segments 120, a plurality of stator segments 140, and a shaft 150. Casing 131 may be joined by forward and aft flanges 135, 136 to additional machine components.

A plurality of rotor segments 120 are disposed inside casing 131. In some embodiments each rotor segment 120 comprises a bladed disc having a plurality of blades 121 coupled to a disc portion 123. Disc portion 123 may be adapted for coupling to shaft 150. In some embodiments each rotor segment 120 comprises a blade 121 coupled to an annular ring 122 having a disc portion 123 for connecting the rotor segment 120 to the shaft 150. Each rotor segment 120 may be referred to as a stage of the compressor.

In some embodiments rotor segment includes an axially-extending sealing arm 124. Sealing arm 124 may be formed integrally with the annular ring 122 or may be formed separately and coupled to annular ring 122. In some embodiments sealing arm 124 may have a plurality of annular knife edges 125 extending radially outward and adapted to engage a portion of a stator segment 140 in order to effectively form a seal. The seal may be referred to as a knife edge seal. In some embodiments the seal formed is a labyrinth seal.

During operation, rotor segments 120, including any sealing arms 124, rotate with shaft 150. The motion of blades 121 drives fluid from the axially forward first end 132 to the axially aft second end 133.

A plurality of stator segments 140 are disposed inside casing 131. Each stator segment 140 comprises an outer flowpath ring 141, an inner flowpath ring 143, and a plurality of stator vanes 142 extending between the outer flowpath ring 141 and inner flowpath ring 143. Stator vanes 142 may be spaced about the circumference of outer flowpath ring 141 and inner flowpath ring 143. Stator segments 140 may be referred to as a banded stator segment, as the stator vane 142 and fluid flow may be banded between outer flowpath ring 141 and inner flowpath ring 143. Each stator segment 140 may be referred to as a stage of the compressor.

In some embodiments, stator vanes 142 are hot upset to one or both of outer flowpath ring 141 and inner flowpath ring 143. During hot upset processing, one or more tangs extending from the end of a stator vane 142 is inserted into one or more slots, respectively, of a flowpath ring. The tang is heated and then deformed to couple the stator vane 142 to the flowpath ring.

Outer flowpath ring 141 is annular and may extend axially forward or aft such that outer flowpath ring 141 is disposed radially outward from one or more adjacent rotor segments 120. Outer flowpath ring 141 may be adapted to couple with casing 131, for example through a tongue and groove, a keyway, or the use of tangs as described in greater detail below. In some embodiments outer flowpath ring 141 includes an abradable ring 146 adapted to ensure that the tip of a blade 121 does not impinge the casing 131 or the outer flowpath ring 141. Abradable ring 146 may be formed from a material which is softer or more maleable than the materials which form the casing 131 or the outer flowpath ring 141. Abradable ring 146 is radially disposed between the blade tips 127 of one of the rotor segments 120 and the casing 131.

Inner flowpath ring 143 is annular and may include a radially inward facing sealing member 145 which is adapted to engage a portion of a sealing arm 124 of a rotor segment 120. In some embodiments sealing member 145 engages a plurality of knife edges 125 extending from sealing arm 124 to form a labyrinth seal. In some embodiments sealing member 145 may be formed as an annular ring. In other embodiments, sealing member 145 comprises a coating applied to inner flowpath ring 143.

During operation, stator segments 140 remain fixed or stationary.

Rotor segments 120 and stator segments 140 are disposed inside casing 131 in alternating fashion, such that stator segments 140 are disposed between a pair of rotor segments 120. In some embodiments, such as that shown in FIG. 1C, axial flow compressor 100 comprises five rotor segments 120 and four stator segments 140. In other embodiments rotor segments 120 and stator segments 140 are disposed in pairs and thus an equal number of rotor segments 120 and stator segments 140 are disposed inside casing 131. Each rotor segment 120 and stator segment 140 pair may be referred to as a stage of the compressor.

A radially inner flow boundary 134 is formed by the annular surface 126 of ring 122 of rotor segment 120 and the annular surface 144 of inner flowpath ring 143 of stator segment 140. The flow boundary 134 may be interrupted by various cavities adjacent the seals between the rotor segments 120 and stator segments 140.

In some embodiments a fluid diffuser 155 is disposed in second end 133 and further defines the fluid flowpath in the axially aft direction. Diffuser 155 may comprise a sealing member 157 adapted to engage at least a portion of a sealing arm 124 of a rotor segment 120. In some embodiments sealing member 157 engages a plurality of knife edges 125 extending from sealing arm 124 to form a labyrinth seal. In some embodiments sealing member 157 may be formed as an annular ring. In other embodiments, sealing member 157 comprises a coating applied to diffuser 155. Diffuser 155 may further comprises a plurality of guide vanes.

In some embodiments the plurality of rotor segments 120 and stator segments 140 may be held in compression by a compressive element, for example a threaded bolt between first end 132 and second end 133 of casing 131.

In some embodiments spacers (not shown) may be included between one or more of the plurality of rotor segments 120 and stator segments 140.

In some embodiments one or more of the plurality of blades 121 and stator vanes 142 are fabricated using stamping, injection molding including metal injection molding, and/or composite and resin fabrication. In some embodiments blades 121 are coupled to annular ring 122 using brazing, welding, or adhesive. In some embodiments stator vanes 142 are coupled between outer flowpath ring 141 and inner flowpath ring 143 using brazing, welding, or adhesive.

With reference now to FIG. 1A, the assembly of the disclosed axial flow compressor will be described. FIG. 1A is a side cutaway view of a partially-assembled axial flow compressor 100. As shown in FIG. 1A, a diffuser segment 155 is initially installed at second end 133 of casing 131. Diffuser segment 155 may act as a backstop which prevents axially aft movement of rotor segments 120 and stator segments 140. In some embodiments diffuser segment 155 comprises an abradable ring 159 which extends axially forward and is disposed radially outward from a rotor assembly 120.

A rotor assembly 120 is inserted into casing 131 at first end 132 and moved axially aft toward second end 133. When in position, a sealing arm 124 may extend from rotor assembly 120 and engage a sealing member 157 of diffuser segment 155.

Following the insertion and position of rotor assembly 120, as shown in FIG. 1A a stator segment 140 is inserted into casing 131 at first end 132 and moved axially aft toward second end 133. FIG. 1B is a side cutaway view of a partially-assembled axial flow compressor 100 and shows the stator segment 140 which was inserted in FIG. 1A in a final position. In some embodiments stator segment 140 may be positioned adjacent the axially-forward side of rotor segment 120. In some embodiments stator segment 140 may be positioned abutting the axially-forward side of rotor segment 120. As shown in FIG. 1B, stator segment 140 comprises an abradable ring 146 which extends axially forward to be disposed between a subsequently-inserted rotor portion 120 and casing 131. In some embodiments stator segment 140 may include an abradable ring 146 which extends axially aft to be disposed between the previously-inserted rotor portion 120 and casing 131.

Once the stator segment 140 is positioned as shown in FIG. 1B, additional rotor segments 120 and stator segments 140 are inserted into casing 131 at first end 132 and moved axially aft toward second end 133. Rotor segments 120 and stator segments 140 are positioned in alternating fashion.

FIG. 1C is a side cutaway view of an axial flow compressor 100 following the assembly process as described above with reference to FIGS. 1A and 1B.

Figure 2:
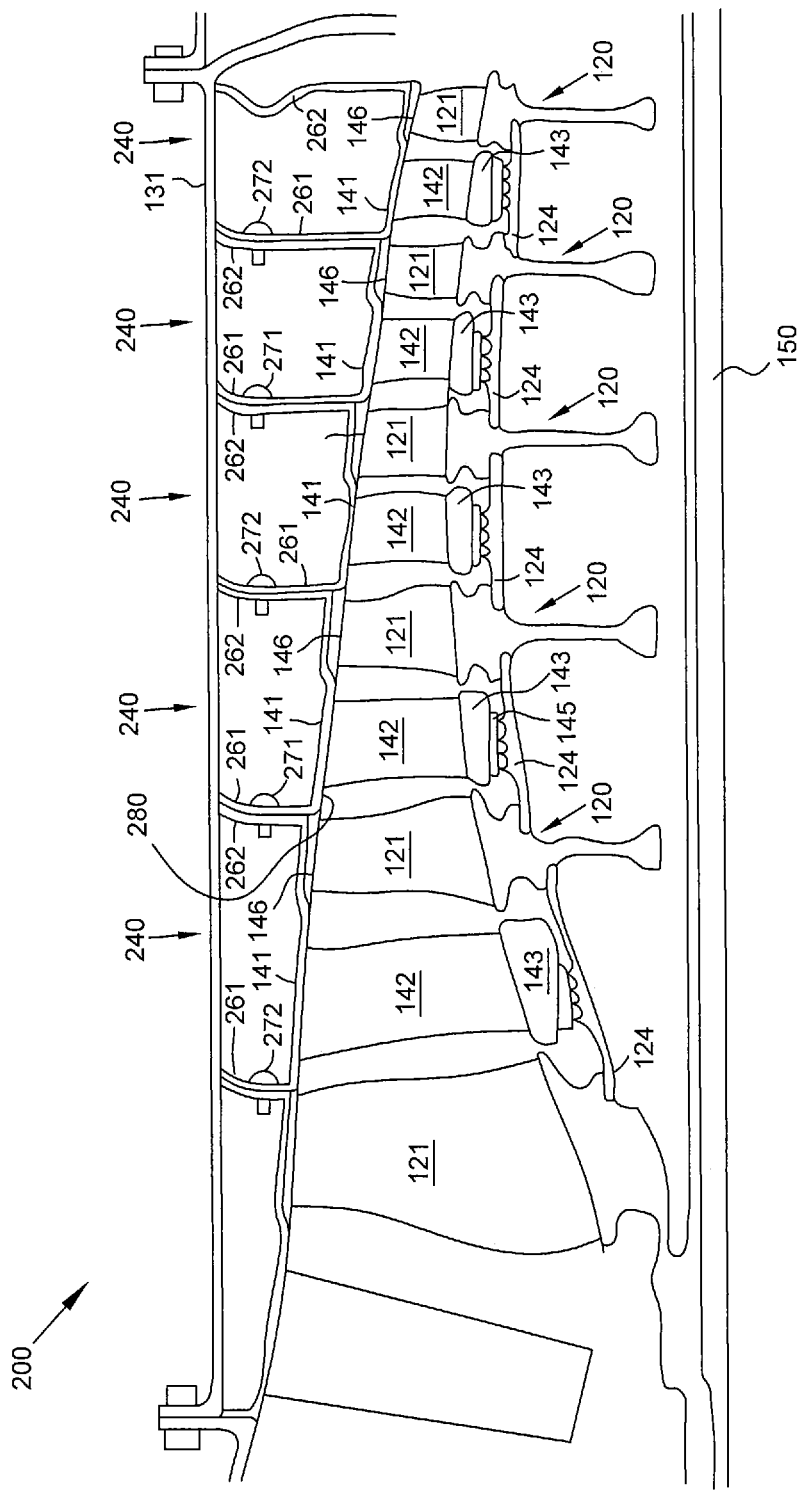
FIG. 2 is a side cutaway view of an axial flow compressor in accordance with some embodiments of the present disclosure.

FIG. 2 is a side cutaway view of an axial flow compressor 200 in accordance with some embodiments of the present disclosure. Axial flow compressor 200 comprises a plurality of rotor segments 120 and stator segments 240 disposed inside a compressor casing 131. Rotor segments 120 are coupled to rotatable shaft 150.

Stator segments 240 comprise an outer flowpath ring 141, an inner flowpath ring 143, and a plurality of stator vanes 142 extending between the outer flowpath ring 141 and inner flowpath ring 143. Stator vanes 142 may be spaced about the circumference of outer flowpath ring 141 and inner flowpath ring 143.

Stator segments 240 further comprise a pair of opposing tangs 261, 262 extending radially outward from the outer flowpath ring 141 in order to space the outer flowpath ring 141 radially inward from the casing 131. Tangs 261 and 262 have curved ends which are configured to engage casing 131 and assist in maintaining the position, once assembled, of stator segments 240. In some embodiments adjacent stator segments 240 may be coupled using one or more fasteners 271, 272. In some embodiments fasteners 271 and 272 may be used to fasten adjacent or abutting tangs 261, 262. In some embodiments fasteners 271 and 272 comprise pins which prevent rotation of stator segments 140 during operation.

Outer flowpath ring 141 is annular and may extend axially forward or aft such that outer flowpath ring 141 is disposed radially outward from one or more adjacent rotor segments 120. In some embodiments outer flowpath ring 141 includes an abradable ring 146 adapted to ensure that the tip of a blade 121 does not impinge the casing 131 or the outer flowpath ring 141. Abradable ring 146 may be formed from a material which is softer or more maleable than the materials which form the casing 131 or the outer flowpath ring 141. Abradable ring 146 is radially disposed between the blade tips 127 of one of the rotor segments 120 and the casing 131.

An outer flow boundary 280 is formed by the radially inner surfaces of each stator segment 240.

Figure 3:
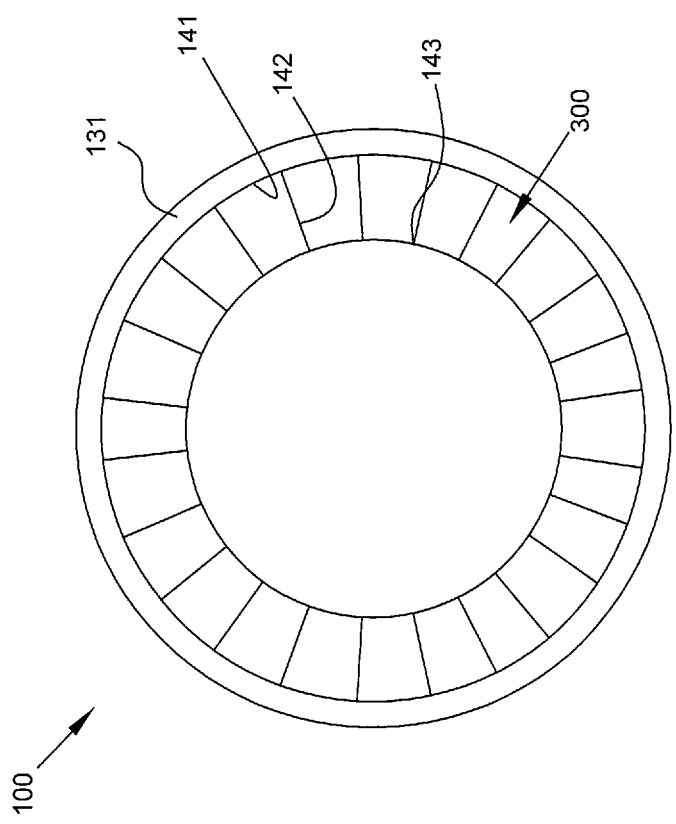
FIG. 3 is an axial profile view of an axial flow compressor in accordance with some embodiments of the present disclosure.

FIG. 3 is an axial profile view of an axial flow compressor 100 viewed from an axially forward position and looking in an axially aft direction. The axial cross-section shown in FIG. 3 is taken at a stator segment 140. Compressor 100 is defined in the radially outward direction by casing 131. A fluid flowpath 300 is partially bounded in a radially outward dimension by the radially inner surface of outer flowpath ring 141 and is partially bounded in a radially inward dimension by the radially outer surface of inner flowpath ring 143. A plurality of stator vanes are disposed circumferentially about and between the outer flowpath ring 141 and inner flowpath ring 143.

The disclosed axial flow compressor as described above has numerous and varied applications in the field of fluid compression. Such applications include, but are not limited to, aviation applications such as gas turbine engines for aircraft and unmanned aerial vehicles (UAVs), expendable compressor applications such as for missile propulsion systems, land- and sea-based gas turbine engines providing electrical generation and/or propulsion, and any rotating machinery generally.

The present disclosure provides many advantages over previous axial flow compressors. In particular, significant cost savings may be achieved by simplicity of design; reduction or elimination of numerous fasteners, discs, and seal assemblies currently required in advanced compressor designs; ease of manufacture and assembly; and substitution of less expensive composite materials for metal and metal-based materials.

Although examples are illustrated and described herein, embodiments are nevertheless not limited to the details shown, since various modifications and structural changes may be made therein by those of ordinary skill within the scope and range of equivalents of the claims.

What is claimed is:

1. An axial flow compressor assembly, comprising:
   a tubular compressor casing configured to encase a portion of a rotatable shaft having an axis of rotation, said tubular compressor casing extending from a first end to a second end wherein the radial distance from the axis of rotation to the compressor casing at the first end is the same as the radial distance from the axis of rotation to the compressor casing at the second end;
   a pair of rotor segments each comprising a bladed disc disposed within said casing, said rotor segments being configured to be coupled to the shaft; and
   a banded stator segment disposed within said casing axially between said pair of rotor segments, said stator segment comprising an outer flowpath ring, an inner flowpath ring, and a plurality of vanes extending between said rings and being spaced around the circumference thereof, said stator segment further comprising an abradable ring extending axially from said outer flowpath ring and radially between the blade tips of one of said rotor segments and said casing,
   wherein said outer flowpath ring is adapted to couple with said compressor casing via a tongue and groove to prevent rotation of said stator segment relative to said compressor casing.

2. The compressor assembly of claim 1, further comprising a sealing arm extending between the pair of rotor segments, the sealing arm adapted to engage a sealing member of the banded stator segment.

3. The compressor assembly of claim 2, wherein the seal formed by the engagement of the sealing arm and the sealing member is a labyrinth seal.

4. The compressor assembly of claim 1, wherein a fluid flowpath is defined in a radially outward dimension by the outer flowpath ring and in a radially inward dimension by the inner flowpath ring and the rotor segment.

5. The compressor assembly of claim 1, further comprising an annular diffuser disposed at an end of the casing.

6. An axial flow compressor assembly, comprising:
   a tubular compressor casing configured to encase a portion of a rotatable shaft;
   a pair of rotor segments each comprising a bladed disc disposed within said casing, said rotor segments being configured to be coupled to the shaft; and
   a banded stator segment disposed within said casing axially between said pair of rotor segments, said stator segment comprising an outer flowpath ring, an inner flowpath ring, and a plurality of vanes extending between said rings and being spaced around the circumference thereof, said stator segment further comprising at least a pair of tangs extending from said compressor casing to said outer flowpath ring to thereby space said outer flowpath ring radially inward from said casing,
   wherein said compressor casing is cylindrical and is configured to contain flow from a second axially rearward end of the compressor casing to a first axially forward end of the compressor casing.

7. The compressor assembly of claim 6, wherein said stator segment further comprises an abradable ring extending axially from said outer flowpath ring and radially between the blade tips of one of said rotor segments and said casing.

8. The compressor assembly of claim 6, further comprising a sealing arm extending between the pair of rotor segments, the sealing arm adapted to engage a sealing member of the banded stator segment.

9. The compressor assembly of claim 8, wherein the seal formed by the engagement of the sealing arm and the sealing member is a labyrinth seal.

10. The compressor assembly of claim 6, wherein a fluid flowpath is defined in a radially outward dimension by the outer flowpath ring and in a radially inward dimension by the inner flowpath ring and the rotor segment.

11. The compressor assembly of claim 6, further comprising an annular diffuser disposed at an end of the casing.

12. The compressor assembly of claim 6, further comprising at least one pin inserted through a pair of adjacent tangs to prevent rotation of adjacent stator segments.

13. The compressor assembly of claim 6, wherein said outer flowpath ring defines a flowpath boundary radially outward of said plurality of vanes and a single adjacent rotor segment.

14. A method of assembling an axial flow compressor, comprising:
- providing a tubular compressor casing having said first end and a second end;
- installing a rotor segment inside said compressor casing from a first end of said casing and positioning said rotor segment proximate the second end of said casing;
- installing a vane segment inside said compressor casing from the first end of said casing and positioning said vane segment adjacent the installed rotor segment;
- installing another rotor segment inside said compressor casing from the first end and positioning the another rotor segment adjacent the installed vane segment;
- installing another vane segment inside said compressor casing from the first end of said casing and positing said another vane segment adjacent the installed rotor segment;
- repeating the steps of installing another rotor segment and installing another vane segment until a desired number of rotor segment and vane segment pairs are installed; and
- installing a final rotor segment inside said compressor casing from the first end and positioning said final rotor segment next to the last installed vane segment,
- wherein said compressor casing is cylindrical and is configured to contain flow from said second end to said first end.

* * * * *